United States Patent Office 2,745,884
Patented May 15, 1956

2,745,884
HALOPHENYLDICHLOROMETHYLPROPENES

Donald G. Kundiger, Manhattan, Kans., and Huey Pledger, Jr., Pittsburgh, Pa., assignors to The Dow Chemical Company, Midland, Mich., a corporation of Delaware No Drawing. Application June 18, 1952,
Serial No. 294,265

3 Claims. (Cl. 260—651)

This invention is concerned with halophenyldichloromethylpropenes and is particularly directed to novel compounds having the formula

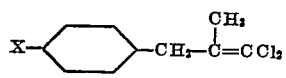

wherein X represents chlorine or bromine. The compounds of the invention are oily liquids substantially insoluble in water and somewhat soluble in many organic solvents. They are useful as toxic ingredients in insecticidal compositions, and as intermediates for the preparation of other chemicals.

The new compounds may be prepared by various methods. A preferred procedure consists of reacting chlorobenzene or bromobenzene with 2-methyl-1,1,3-trichloro-1-propene in the presence of aluminum chloride as a catalyst. This method is the subject of our copending application Serial No. 294,266, now abandoned, filed concurrently herewith.

In a representative operation, 48 grams (0.3 mole) of 2-methyl-1,1,3-trichloro-1-propene and 112 grams (1 mole) of chlorobenzene were mixed together and heated to a temperature of 100° C. 5 grams (0.037 mole) of anhydrous aluminum chloride was added portionwise to the above mixture with constant stirring over a period of 30 minutes. At the end of this period, stirring was continued and the temperature of the reaction vessel and contents maintained at 95°–110° C. for a further 30 minutes. The crude reaction mixture was then poured onto crushed ice containing about one part by weight concentrated hydrochloric acid for each 10 parts of crushed ice. Ether was added and the organic layer separated from the aqueous layer and submitted to fractional distillation to recover ether and unreacted chlorobenzene and to separate a 3-(4-chlorophenyl)-1,1-dichloro-2-methyl-1-propene product boiling at 91.3°–94° C. at 0.65 millimeter pressure and having a refractive index (n/D of 1.5576 at 20° C. The product had a density (20°/4°) of 1.283 and an analysis as set forth in the following table.

| Percent by Weight of— | Observed | Theoretical |
|---|---|---|
| Chlorine | 44.47 | 45.2 |
| Carbon | 50.85 | 50.99 |
| Hydrogen | 3.89 | 3.85 |

In an exactly similar manner, 48 grams of 2-methyl-1,1,3-trichloro-1-propene and 159 grams of bromobenzene are mixed together and heated in the presence of 5 grams of anhydrous aluminum chloride. The resulting product is worked up and fractionally distilled as set forth above to obtain a 3-(4-bromophenyl)-1,1-dichloro-2-methyl-1-propene product boiling at 110°–111° C. under 0.9 millimeter pressure. This product has a refractive index (n/D of 1.5747 at 20° C., a density (20°/4°) of 1.508 and an elementary analysis as set forth in the following table.

| Percent by Weight of— | Observed | Theoretical |
|---|---|---|
| Bromine | 28.45 | 28.54 |
| Carbon | 42.57 | 42.89 |
| Hydrogen | 3.30 | 3.24 |
| Chlorine | 25.4 | 25.3 |

The compounds of the invention may be mixed with xylene and a non-ionic emulsifying agent in various proportions by weight as for example 25 parts halophenyl dichloro-methyl-propene, 65 parts xylene and 10 parts emulsifier, to prepare concentrates adapted to be dispersed in water to provide contact insecticidal spray emulsions. These compositions are effective against aphid and mite organisms.

We claim:
1. A compound of the formula

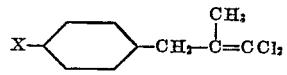

wherein X represents a member of the group consisting of chlorine and bromine.

2. 3 - (4 - chlorophenyl) - 1,1 - dichloro - 2 - methyl-1-propene.

3. 3 - (4 - bromophenyl) - 1,1 - dichloro - 2 - methyl-1-propene.

References Cited in the file of this patent
UNITED STATES PATENTS 2,485,017     Schmerling _____ Oct. 18, 1949

OTHER REFERENCES

Price et al.: "Jour. of Org. Chem.," vol. 8, page 522.
Müller: "Angew. Chem.," vol. 61, pages 179–83 (1949).